United States Patent
Luebke et al.

(10) Patent No.: US 9,186,854 B1
(45) Date of Patent: Nov. 17, 2015

(54) METHOD OF FABRICATION OF SUPPORTED LIQUID MEMBRANES

(71) Applicants: David R. Luebke, Bethel Park, PA (US);
Lei Hong, Pittsburgh, PA (US);
Christina R. Myers, Pittsburgh, PA (US)

(72) Inventors: David R. Luebke, Bethel Park, PA (US);
Lei Hong, Pittsburgh, PA (US);
Christina R. Myers, Pittsburgh, PA (US)

(73) Assignee: U.S. Department of Energy, Washington, DC (US)

( * ) Notice: Subject to any disclaimer, the term of this patent is extended or adjusted under 35 U.S.C. 154(b) by 523 days.

(21) Appl. No.: 13/783,531

(22) Filed: Mar. 4, 2013

(51) Int. Cl.
*B01D 61/38* (2006.01)
*B29D 7/01* (2006.01)

(52) U.S. Cl.
CPC . *B29D 7/01* (2013.01); *B01D 61/38* (2013.01)

(58) Field of Classification Search
CPC ...................................................... B01D 61/38
See application file for complete search history.

(56) References Cited

PUBLICATIONS

Hernandez-Fernandez et al., "Preparation of supported ionic membranes: Influence of the ionic liquid immobilization method on their operational stability," Journal of Membrane Science 341 (2009).
Neves et al., "Gas permeation studies in supported ionic liquid membranes," Journal of Membrane Science 357 (2010).

*Primary Examiner* — Alex A Rolland
(74) *Attorney, Agent, or Firm* — James B. Potts; Brian J. Lally; John T. Lucas (57) ABSTRACT

Method for the fabrication of a supported liquid membrane having a dense layer in contact with a porous layer, and a membrane liquid layer within the interconnected pores of the porous layer. The dense layer is comprised of a solidified material having an average pore size less than or equal to about 0.1 nanometer, while the porous layer is comprised of a plurality of interconnected pores and has an average pore size greater than 10 nanometers. The supported liquid membrane is fabricated through the preparation of a casting solution of a membrane liquid and a volatile solvent. A pressure difference is established across the dense layer and porous layer, the casting solution is applied to the porous layer, and the low viscosity casting solution is drawn toward the dense layer. The volatile solvent is evaporated and the membrane liquid precipitates, generating a membrane liquid layer in close proximity to the dense layer.

20 Claims, 4 Drawing Sheets

METHOD OF FABRICATION OF SUPPORTED LIQUID MEMBRANES

GOVERNMENT INTERESTS

The United States Government has rights in this invention pursuant to the employer-employee relationship of the Government to the inventors as U.S. Department of Energy employees and site-support contractors at the National Energy Technology Laboratory.

FIELD OF THE INVENTION

One or more embodiments of the present invention relates to a method for the fabrication of a supported liquid membrane, where the supported liquid membrane is comprised of a dense layer in contact with a porous supporting layer, and further comprised of a thin, continuous liquid layer within the pores of the porous layer and in close proximity or contact with the dense layer.

BACKGROUND

Supported liquid membranes have been widely studied for the separation and concentration of a variety of compounds and present many potential advantages over other separation techniques. In a supported liquid membrane, the pores of a supporting membrane are impregnated with a particular liquid, and transport of the permeating species occurs by a solution diffusion mass transfer mechanism. The diffusion of species in liquids is generally faster than diffusion in solids, and the permeability across supported liquid membranes is typically greater than that achieved using solid membranes.

Supported liquid membranes are typically fabricated by either direct immersion, or various pressure and vacuum methods. In direct immersion, immobilization of the membrane liquid takes places by contacting or immersing the supporting membrane and allowing the supporting membrane to soak up the membrane liquid. In pressure methods, immobilization is achieved by contacting a porous membrane and a membrane liquid, and applying typically nitrogen pressure to force the membrane liquid to flow into the pores of the membrane. The vacuum method operates by submerging the porous membrane in a volume of membrane liquid and applying a vacuum to the membrane in order to evacuate the membrane pore and draw in the membrane liquid. The pressure and vacuum methods are typically utilized on supporting membranes generally classified as macroporous with a pore sizes of at least greater than 50 nanometers, and typically in the hundreds of nanometers, and success is gauged either by the visual presence of membrane liquid in all pores of the supporting membrane or by the presence of membrane liquid being forced through the lower pressure membrane surface. Pressure and vacuum methods have also been particularly applied to membrane liquids of relatively high viscosity, such as ionic liquids. See e.g., Hernandez-Fernandez et al., "Preparation of supported ionic liquid membranes: Influence of the ionic liquid immobilization method on their operational stability," *Journal of Membrane Science* 341 (2009); see also Neves et al., "Gas permeation studies in supported ionic liquid membranes," *Journal of Membrane Science* 357 (2010).

The current methods of supported liquid membrane fabrication suffer from a number of shortcomings, such as the unsustainable loss of membrane liquid in macroporous supporting membranes under applicable operating conditions. This membrane liquid loss in-situ is typically attributed to a differential pressure across the macroporous membrane in excess of a capillary force maintaining the membrane liquid immobilized, and places limits on the differential pressure that the supported liquid membrane can sustain. This maximum differential pressure is related to the maximum pore size of the membrane, the pore structure, the interfacial tension of membrane liquids, and the contact angle, among other factors. See e.g., Zhao et al., "Membrane liquid loss mechanism of supported ionic liquid membrane for gas separation," *Journal of Membrane Science* 411-412 (2012).

On the other hand, gas separation membranes which operate in the absence of a supported liquid typically consist of a dense film, through which permeates are transported by diffusion under the driving force of a pressure or concentration. These dense film membranes may be significantly more tolerant of differential pressures, however they suffer from a permeability-selectivity tradeoff, where generally as permeability improves the selectivity declines, and vice versa. It would be advantageous to provide a method whereby a membrane liquid could be placed within the pores of a supporting membrane having a dense, skin surface, so that a highly permeable dense layer could be coupled with a highly selective membrane liquid, the permeability-selectivity tradeoff could be greatly reduced, and a differential pressure across the supported liquid membrane could be applied with mitigated concern toward its relation to a capillary force. A limitation of polymeric membranes for gas and vapour transport is the so-called permeability-selectivity trade-off, first reported by Robeson et al. in 1991 and then further updated. This trade-off basically allows that if one is looking for a new material with a higher permeability, the price to pay is a lower selectivity, and vice versa.

Additionally, the membrane liquid layer thickness is of significant concern in supported liquid membranes. Typically, the immersion, pressure and vacuum methods applied to porous supporting membranes offers little control over the resulting liquid layer thickness, and during fabrication the liquid typically extends throughout all pores of the supporting membrane. As a second step, the supported liquid is usually allowed to drain under the influence of gravity or some other force from those pores exerting an insufficient capillary force, so that the final layer thickness and location becomes largely a function of local pore size, pore configuration, the viscosity of the membrane liquid, and the surface tension of the liquid. This liquid layer thickness generally has an inversely proportional influence on permeability, and correspondingly the permeance of the supported liquid membrane suffers, or at a minimum is poorly controlled during fabrication. It would be advantageous to provide a method whereby the membrane liquid could be distributed within the pores of a supporting membrane in a relatively thin, continuous fluid layer, as opposed to a layer which generally extends throughout the interconnected pores of the supporting membrane.

Additionally, significant work is underway to mitigate the relative instability and short lifetimes of supported liquid membranes by utilizing ionic liquids as the membrane liquid. Careful selection of the cation and anion makes possible minimal vaporization losses, and their generally high chemical and thermal stability, high ion conductivity, and high solvent power provide additional advantages. The large diversity of ionic liquids is a result of the nearly unlimited combination of cations and anions which can permit very precise tuning of the ionic liquid solvation properties, density, viscosity, melting point, and even conductivity, enabling the rational design for specific applications. See e.g., Ilconich, et al., "Experimental investigation of the permeance and selectivity of supported ionic liquid membranes for $CO_2$/He separation at temperatures up to 125° C.," *Journal of Membrane*

*Science*, 41-47, (2007); see also Pennline, et al., Progress in carbon dioxide capture and separation research for gasification-based power generation point sources, *Fuel Process. Technol.* 897-907, (2012). However, ionic liquids possess relatively high viscosities, and the preparation of supported ionic liquid membranes using either immersion, pressure, or vacuum applied to a supporting membrane having a dense layer is difficult. It would be particularly advantageous to provide a method where a relatively high viscosity ionic liquid could be placed within the pores of a supporting membrane having a dense, skin surface, so that the ionic liquid could be distributed within the pores of the supporting membrane in a relatively thin, continuous fluid layer, and so that a highly selective ionic liquid could be coupled with a permeable dense layer, greatly mitigating the permeability-selectivity tradeoff of gas separation membranes, and greatly reducing concerns stemming from the relationship between a differential pressure and the capillary forces within the pores in an operating environment.

These and other objects, aspects, and advantages of the present disclosure will become better understood with reference to the accompanying description and claims.

SUMMARY

The disclosed method provides for the fabrication of a supported liquid membrane having a dense layer in contact with a porous layer, and further comprised of a membrane liquid layer within the interconnected pores of the porous layer. The dense layer is comprised of a solidified material having an average pore size less than or equal to about 0.1 nanometer, while the porous layer is comprised of a plurality of interconnected pores and has an average pore size greater than 10 nanometers. The membrane liquid layer is contained within the plurality of interconnected pores and generally within close proximity or contact with the dense layer. The method disclosed is particularly advantageous for the production of membrane liquid layers of relatively high viscosity, such as ionic liquids.

The supported liquid membrane is fabricated through the preparation of a casting solution, comprised of the membrane liquid intended to comprise the membrane liquid layer and a volatile solvent. The volatile solvent could be a single solvent or a mixture of different solvents and is chosen for several properties including wettability between the solvent and the substrate material, viscosity, and miscibility with the membrane liquid. The volatile solvent has a vapor pressure less than 400 torr at 25° C., and upon mixing, the casting solution has a viscosity less than 100 centipoise. The membrane liquid and the volatile solvent comprising the casting solution may be mixed in any proportion provided solubility and viscosity constraints are met. In an embodiment where the membrane liquid is an ionic liquid, the ionic liquid concentration in the casting solutions is from about 5 mg/mL to about 500 mg/mL.

The membrane liquid layer is fabricated by establishing a gaseous atmosphere around the porous layer and within the plurality of interconnected pores. The gaseous atmosphere exerts a total pressure within the plurality of interconnected pores. Further, the gaseous atmosphere is comprised of a gas or gas mixture having a partial pressure of the volatile solvent less than the vapor pressure of the volatile solvent. Concurrently, a pressure difference is established across the dense layer and porous layer of the membrane of from about 100 to about 600 torr less than the total pressure exerted by the gaseous atmosphere. The average pore size of less than or equal to about 0.1 nanometer in the dense layer assists in maintaining this pressure difference. A volume of casting solution is then applied to porous layer.

An appropriate wettability of the casting solution generates some degree of spreading on contact with the porous layer, and the pressure difference acting across the dense layer and the porous layer acts with capillary force to draw the casting solution into the plurality of interconnected pores and toward the dense layer. The average pore size of less than or equal to about 0.1 nanometer in the dense layer greatly mitigates or eliminates the continuing migration of the deposited casting solution toward the reduced pressure opposite the dense layer, and the deposited casting solution largely stabilizes into a substantially contiguous liquid layer extending through the plurality of interconnected pore, and generally in close proximity or contact with to the dense layer.

With the casting solution layer established and under the influence of the gaseous atmosphere, the membrane liquid layer is generated by solvent evaporation under vacuum, and corresponding membrane liquid precipitation from the casting solution. Generally, the precipitated liquid has a viscosity significantly greater than that of the casting solution, and the resulting membrane liquid layer is subject to a high capillary force within the interconnected pores of the supported liquid membrane. In an embodiment, a heat treatment is applied following the application of the casting solution to the porous layer to aid in the spreading of the deposited casting solution as well as accelerating the evaporation of the volatile solvent and the precipitation of the membrane liquid. The heat treatment also serves to accelerate equilibration of the membrane liquid layer within the pores and helps to produce a continuous liquid layer and eliminate defects. In some cases, defects by also be reduced through multiple applications of the casting solution.

The novel process and principles of operation are further discussed in the following description.

DETAILED DESCRIPTION

The following description is provided to enable any person skilled in the art to use the invention and sets forth the best mode contemplated by the inventor for carrying out the invention. Various modifications, however, will remain readily apparent to those skilled in the art, since the principles of the present invention are defined herein specifically to provide a method for the fabrication of a supported liquid membrane having a dense layer in contact with a porous layer, and further comprised of a membrane liquid layer within the interconnected pores of the porous layer.

Figure 1:
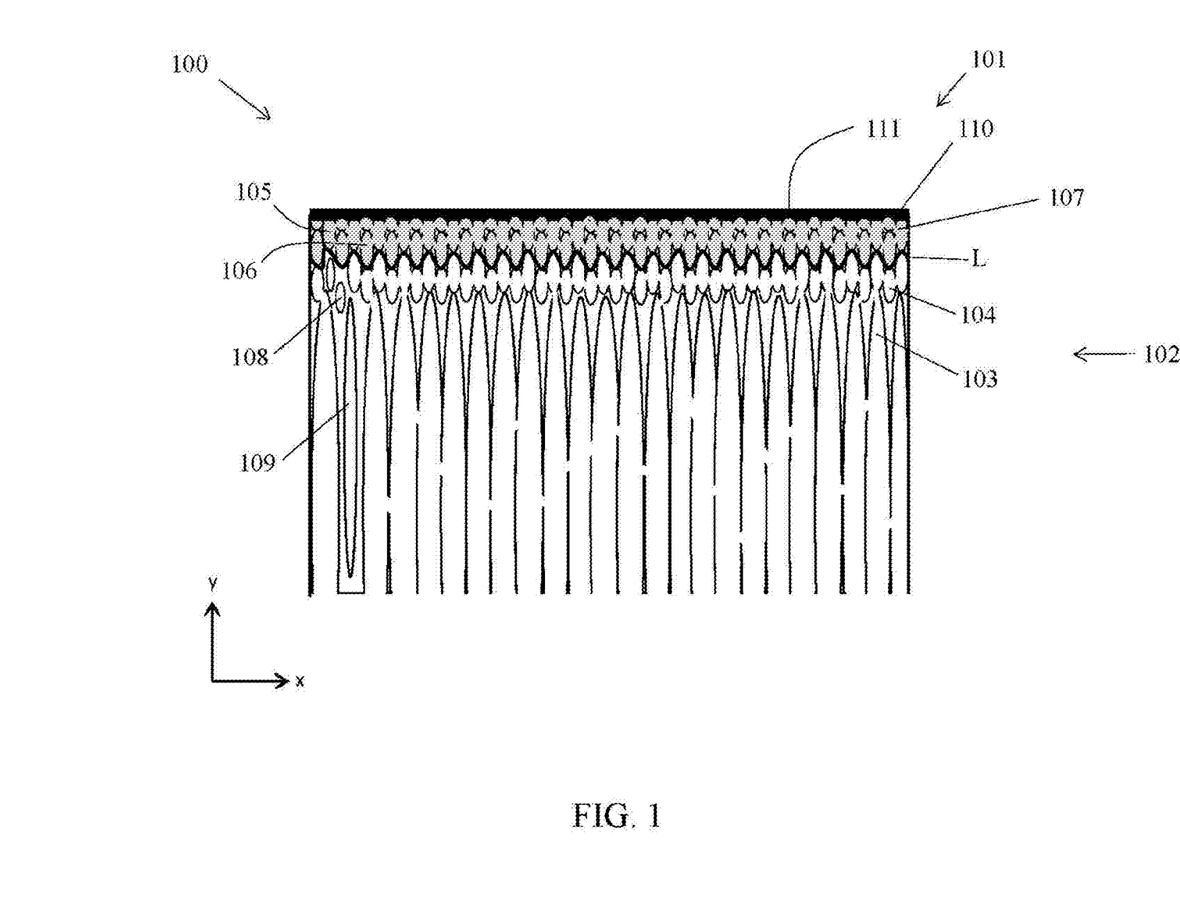
FIG. 1 illustrates a supported liquid membrane.

The supported liquid membrane fabricated under the method of this disclosure is generally illustrated at FIG. 1. Supported liquid membrane 100 is comprised of dense layer 101 in contact with a porous layer generally indicated at 102. Porous layer 102 is comprised of a plurality of interconnected pores, such as pores 103, 104, 105, and 106. Supported liquid membrane 100 is further comprised of membrane liquid layer 107 residing in some portion of the plurality of interconnected pores and in contact with dense layer 101, as illustrated. At FIG. 1, membrane liquid layer 107 is illustrated between liquid boundary L and dense layer 101, and is comprised of a membrane liquid within some portion of the plurality of interconnected pores comprising porous layer 102, such as pores 105 and 106.

Dense layer 101 is comprised of a dense material 110. The dense material 110 is a solidified material having an average pore size less than or equal to about 0.1 nanometer. Preferably dense material 110 has an absence of interconnected pores, although the presence or absence of interconnected porosity within dense material 110 is not a limitation within this disclosure. Additionally, dense layer 101 is comprised of skin surface 111. Skin surface 111 is an outer surface of dense layer 101 which is separated from porous layer 102 by at least a portion of dense material 110, as illustrated.

As stated, porous layer 102 is comprised of a plurality of interconnected pores, such as pores 103, 104, 105, and 106. The plurality of interconnected pores comprising porous layer 102 have an average pore size of at least greater than 10 nanometers. Typically the porosity of porous layer 102 is from about 20% to about 80%. Here "interconnected" means that each interconnected pore in the plurality of interconnected pores is in fluid communication with every other interconnected pore in the plurality of interconnected pores, so that a fluid path exists through the plurality of interconnected pores from any interconnected pore in the plurality to any other interconnected pore in the plurality. Additionally, the plurality of interconnected pores is in fluid communication with an atmosphere surrounding porous layer 102, through one or more interconnected pores in the plurality. Correspondingly, with reference to FIG. 1, a fluid path exists from, for example, pore 103 to pores 104, 105, and 106, and pores 103, 104, 105, and 106 are further in fluid communication with the atmosphere surrounding porous layer 102. However, porous layer 102 may be additionally comprised of dead pores such as pores 108 and 109, which are present within porous layer 102 but not in fluid communication with the plurality of interconnected pores. Additionally, porous layer 102 may be comprised of a first plurality of interconnected pores, and second plurality of interconnected pores, and so on where, for example, the first plurality of interconnected pores is not in fluid communication with the second plurality of interconnected pores. Within this disclosure, the term "a plurality of interconnected pores" may mean any plurality of interconnected pores, provided that each interconnected pore in the plurality is in fluid communication with every other interconnected pore in the plurality.

In a typical configuration, when skin surface 111 is parallel to the x-axis indicated at FIG. 1, dense layer 101 has a thickness of less than 1 micron in the direction of the y-axis at FIG. 1, while porous layer 102 has a thickness in the direction of the y-axis of about 50 microns or more.

Membrane liquid layer 107 is comprised of a membrane liquid within the plurality of interconnected pores comprising porous layer 102. Membrane liquid layer 107 is comprised of at least one contiguous liquid layer extending within the plurality of interconnected pores, and may be comprised of multiple discrete and separate contiguous liquid layers when, for example, porous layer 102 is comprised of a first plurality of interconnected pores and second plurality of interconnected pores. In such a case, membrane liquid layer 107 may be comprised of a first contiguous liquid layer extending within the first plurality of interconnected pores and a second contiguous liquid layer extending within the second plurality of interconnected pores, where the first contiguous liquid layer is not in fluid communication with the second contiguous liquid layer. However, the above is not intended to imply that the membrane liquid comprising membrane liquid layer 107 is necessarily present in all interconnected pores comprising a given plurality of interconnected pores. Typically, in the supported liquid membranes fabricated under the methodology of this disclosure, membrane liquid layer 107 will be comprised of one or more contiguous liquid layers each contained only within some portion of the interconnected pores comprising a given plurality of interconnected pores.

Membranes comprised of a dense layer such as dense layer 107 and a porous support structure such as porous layer 102 are available and known in the art. Such membranes may be composite membranes, where typically different materials and/or fabrication processes are utilized to generate a dense layer and a porous support separately, followed by joining the dense layer and the porous support in order to generate the composite membrane. See e.g., U.S. Pat. No. 4,840,819 to Williams et al., U.S. Pat. No. 4,806,189 to Kraus et al., U.S. Pat. No. 5,320,754 to Kohn et al., and U.S. Pat. No. 6,923,846 to Nelson, among others. Alternatively, a membrane may be an asymmetric membrane where the dense layer and porous support are comprised of the same original material, but where the particular fabrication process utilized results in differing morphologies between the respective layers. See e.g., U.S. Pat. No. 4,486,202 to Malon et al. and U.S. Pat. No. 4,673,418 to Pienemann, among others. The methodology of this disclosure provides a means by which a membrane liquid layer such as membrane liquid layer 107 may be established within a membrane having a dense layer such as dense layer 107 and a porous support such as porous support 102. The method allows the achievement of a relatively thin, continuous layer of the membrane liquid residing within the porous support and in close proximity to the dense layer.

Figure 2:
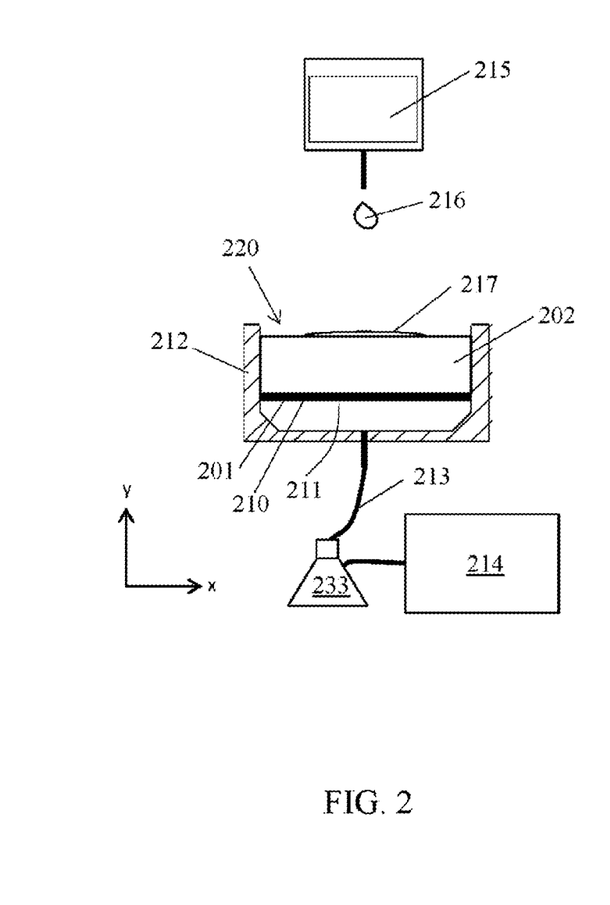
FIG. 2 illustrates a methodology for fabricating a supported liquid membrane.

The methodology of this disclosure is schematically represented at FIG. 2. FIG. 2 illustrates a membrane 220 comprised of dense layer 201 comprised of dense material 210 and having skin surface 211. Membrane 220 is further comprised of porous layer 202 supporting dense layer 201. Porous layer 202 is comprised of a plurality of interconnected pores. As discussed, dense material 210 is a solidified material having an average pore size less than or equal to about 0.1 nanometer, porous layer 202 is comprised of a plurality of interconnected pores having an average pore size of at least greater than 10 nanometers, and skin surface 211 is an outer surface of dense layer 201 which is separated from porous layer 202 by at least a portion of dense material 210, as illustrated. The average pore size of the dense layer and porous layer will typically be available from a commercial manufacturer of the membrane. Alternately, average pore size may be determined by methods such as ASTM-F316-03, ASTM E128-99 and other methods, or by means known in the art such as molecular weight cut-off determination, electron microscopy, thermoporometry, biliquid permporometry, permporometry, and others. See e.g., Kim et al., "A comparative study of techniques used for porous membrane characterization: pore characterization," *Journal of Membrane Science* 81 (1994), among others.

Membrane 220 is held in membrane test cell 212. Membrane test cell 212 securely holds membrane 220 in such a manner that a vacuum may be established from vacuum pump 214 through fluid trap 233 and fluid passage 213 and act on skin surface 211 while porous layer 202 is maintained at a higher pressure, such as atmospheric. The evaporated solvent is allowed to condense in fluid trap 233 connected to fluid passage 213. Such membrane test cells are known in the art. See e.g., U.S. Pat. No. 4,137,756 to Cosack et al., U.S. Pat. No. 4,846,970 to Bertelson et al., and U.S. Pat. No. 4,545,863 to Yeager et al., among many others. However, the use of a membrane test cell as that term is typically known in the art is not a limitation of this disclosure. Within this disclosure, any device capable of supporting a membrane such that a differential pressure may be established between the skin surface and porous support of the membrane may be used to accomplish the methodology disclosed herein.

In order to form a membrane liquid layer within membrane 220 of FIG. 2, a casting solution 215 is prepared. Casting solution 215 is prepared by mixing the membrane liquid intended to comprise the membrane liquid layer and a volatile solvent. The membrane liquid is soluble and miscible in the volatile solvent, and the volatile solvent has a vapor pressure than 400 torr at 25° C. Additionally, upon mixing, casting solution 215 has a viscosity less than 100 centipoise at 25° C. As used herein, the term "soluble" with respect to a particular solute and solvent means an equilibrium concentration of greater than 1 wt. % solute in a solution of the solute and a solvent. For example, within this disclosure, when a membrane liquid is soluble in a solvent, the equilibrium concentration of the membrane liquid in a membrane liquid/volatile solvent solution is greater than 1 wt. % membrane liquid. Additionally within this disclosure, the term "miscible" means the property of liquids to mix in all proportions, forming a homogeneous solution.

The membrane liquid may be any liquid intended to comprise the membrane liquid layer provided that the membrane liquid is soluble and miscible in the volatile solvent. In an embodiment, the membrane liquid is a relatively high viscosity liquid having a viscosity greater than about 25 centipoise at a temperature of 25° C. In another embodiment, the membrane liquid is an ionic liquid. In still another embodiment, the membrane liquid is an ionic liquid having a viscosity of greater than about 100 centipoise at a temperature of 25° C. As used here, the term "ionic liquid" means a nonpolymeric salt comprising an organic cation and any variety of anions having a viscosity less than about 250,000 centipoise at 25° C. Typically the ionic liquid has a viscosity less than about 5,000 centipoise at 25° C. See e.g., Yu et al., "Viscosity of Ionic Liquids: Database, Observation, and Quantitative Structure-Property Relationship Analysis," *AICHE Journal*, Vol. 8, No. 9 (2012), among others. The salt may contain monovalent or polyvalent anions or cations, and may be a single salt or a mixture of salts.

The volatile solvent may be any solvent provided that the membrane liquid is soluble and miscible in the solvent, and provided that the volatile solvent has a vapor pressure less than 400 torr at 25° C. In an embodiment where the membrane liquid is an ionic liquid, the volatile solvent is acetone, ethanol, or a mixture of acetone and ethanol. Additionally, the membrane liquid and the volatile solvent comprising the casting solution may be mixed in any proportion, provided that the resulting mixture has a viscosity less than about 100 centipoise at 25° C., and provided that the equilibrium concentration of the membrane liquid in the casting solution is greater than 1 wt. % membrane liquid. In an embodiment, the viscosity of the casting solution is less than 50 centipoise at 25° C. In another embodiment, the viscosity of the casting solution is less than 10 centipoise at 25° C. The viscosity of the resultant casting solution may be verified with a viscometer, a visual observation of flow behavior, through experience with similar membrane liquids and volatile solvents, or using any other means known in the art. Sufficient dissolution of the membrane liquid in the volatile solvent may be verified through visual means, through experience with similar membrane liquids and volatile solvents, through the use of appropriate equilibrium constants, through titration, or through other means known in the art. In an embodiment where the membrane liquid is an ionic liquid, the ionic liquid concentration in the casting solutions is from about 5 milligrams of ionic liquid per milliliter of casting solution to about 500 milligrams of ionic liquid per milliliter of casting solution.

The selection of the solvents is a key in designing the supported liquid membrane because of its dual roles in the process. High viscosity of ionic liquid impedes the process of forming a contiguous liquid layer in the membrane. Dissolution of ionic liquid in volatile solvents significantly lowers the viscosity and improves the mobility of ionic liquids. More importantly, the solvent acts as a carrier to deliver the ionic liquid to the target position in the porous region.

In order to form a membrane liquid layer in membrane 220, a gaseous atmosphere is established around porous layer 202, and correspondingly established within the plurality of interconnected pores comprising porous layer 202 by virtue of the fluid communication between the plurality of interconnected pores and the atmosphere surrounding porous layer 202, as discussed. The gaseous atmosphere exerts a total pressure within the plurality of interconnected pores, and further is comprised of a gas or gas mixture having a partial pressure of the volatile solvent less than the vapor pressure of the volatile solvent. Additionally, the gaseous atmosphere is comprised of gaseous species capable of permeating dense layer 201. For example, in an embodiment, the casting solution is comprised of the volatile solvent having a vapor pressure less than 400 torr at 25° C., and porous layer 202 is surrounded by a gaseous atmosphere of air at atmospheric pressure. The air exerts a total pressure equal to atmospheric within the plurality of interconnected pores comprising porous layer 202, and the air has a partial pressure of the volatile solvent which is less than the vapor pressure of the volatile solvent.

Concurrently, a pressure difference is established across dense layer 201 and porous layer 202 such that a total pressure on skin surface 211 is from about 100 to about 600 torr less than the total pressure exerted by the gaseous atmosphere within the plurality of interconnected pores comprising porous layer 202. For example, at FIG. 2, vacuum pump 214 acts through fluid path 213 to establish a vacuum of from about 100 to about 600 torr within test cell 212, so that the 100-600 torr vacuum acts on skin surface 211 while the gaseous atmosphere of air surrounding porous layer 202 establishes the plurality of interconnected pores within porous layer 202 at essentially atmospheric pressure. In an embodiment, vacuum pump 214 establishes a vacuum of from about 200 to about 500 torr. The average pore size of less than or equal to about 0.1 nanometer in dense material 210 assists in maintaining this pressure difference.

Once the gaseous atmosphere is established around porous layer 202 within the plurality of interconnected pores comprising porous layer 202, and the pressure difference of from about 100 to about 600 torr is established across dense layer 201 and porous layer 202, a volume of casting solution 216 is applied to porous layer 202, generating deposited casting solution 217 on porous layer 202. The viscosity of the volume of casting solution 216 allows deposited casting solution 217 to experience some degree of spreading on contact with porous layer 202, and the pressure difference acting across dense layer 201 and porous layer 202 acts to draw at least some portion, and typically substantially all, of the deposited casting solution 217 into the plurality of interconnected pores within porous layer 202 and toward dense layer 201, generating a relatively thin casting solution layer in close proximity or in contact with dense layer 201. The process is facilitated by capillary action which naturally causes the casting solution to diffuse toward the smallest pores which are located near dense layer 201. The average pore size of less than or equal to about 0.1 nanometer in dense material 210 greatly mitigates or eliminates the continuing migration of the deposited casting solution toward the reduced pressure opposite dense layer 201, and the deposited casting solution largely stabilizes. The resulting casting solution layer thereby generated is a substantially contiguous liquid layer which extends through some portion of the plurality of interconnected pores, and generally within those pores in close proximity to dense layer 201.

Figure 3:
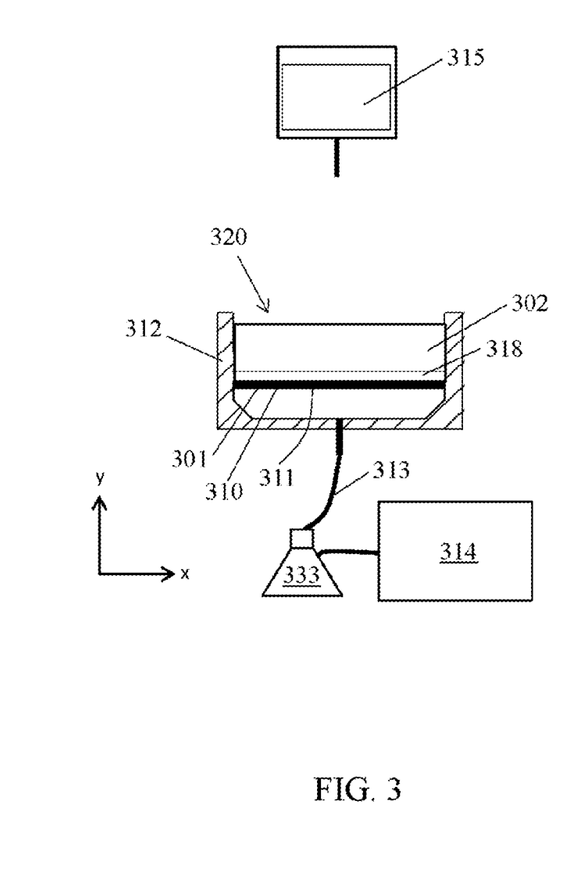
FIG. 3 illustrates a membrane comprised of a casting solution layer.

As an example, FIG. 3 illustrates a membrane 320 held in membrane cell 312 and comprised of dense layer 301, dense material 310, skin surface 311, and porous layer 302. Additionally illustrated are casting solution 315, vacuum pump 314, fluid trap 333, and fluid passage 313. At FIG. 3, the vacuum applied by vacuum pump 314 to skin surface 311 of membrane 320 combined with the low viscosity of casting solution 315 has drawn a volume of deposited casting solution to a region of the interconnected pores in proximity to dense layer 301, generating casting solution layer 318 in close proximity or in contact with dense layer 301. The average pore size of less than or equal to about 0.1 nanometer in dense material 310 has greatly mitigated or eliminated the continuing migration of casting solution layer 318 toward the reduced pressure opposite dense layer 301.

At FIG. 3, casting solution layer 318 may be comprised of multiple discrete and separate contiguous liquid layers, similar to the membrane liquid layer discussed earlier. For example, when porous layer 302 of membrane 320 is comprised of a first plurality of interconnected pores and second plurality of interconnected pores, casting solution layer 318 may be comprised of a first contiguous liquid layer extending within the first plurality of interconnected pores and a second contiguous liquid layer extending within the second plurality of interconnected pores, where the first contiguous liquid layer is not in fluid communication with the second contiguous liquid layer.

Without being bound by theory, the pressure difference of 100-600 torr across dense layer 201 generally acts to maintain a concentration gradient across dense layer 201 and drive gaseous species in the gaseous atmosphere from porous layer 202 through dense layer 201, largely by diffusion. The relatively low viscosity of the casting solution allows the resulting pressure driving force through porous layer 202 to pull the casting solution toward dense layer 201 and throughout some portion of the interconnected pores in close proximity or contact with dense layer 201. As a result, under the influence of the pressure difference across dense layer 201 and the spreading of the casting solution resulting from the reduced viscosity, a relatively thin casting solution layer in close proximity or contact with dense layer 201 is generated, such as casting solution layer 318 in close proximity or contact with dense layer 301.

With the casting solution layer established, the membrane liquid layer is generated by waiting a sufficient time for the volatile solvent within the casting solution to evaporate, and correspondingly for the membrane liquid within the casting solution to precipitate. Having established the gaseous atmosphere around porous layer 102 and within the plurality of interconnected pores, and having ensured that the partial pressure of the volatile solvent in the gaseous atmosphere is less than the vapor pressure of the volatile solvent, the resulting evaporation of the volatile solvent into the gaseous atmosphere precipitates the membrane liquid and transitions the casting solution layer into membrane liquid layer 107, resulting in a supported liquid membrane with a relatively thin, substantially continuous membrane liquid layer in close proximity or contact with dense layer 101. Generally, the precipitated liquid has a viscosity significantly greater than that of the casting solution, and membrane liquid layer 107 is subject to a high capillary force within the interconnected pores of supported liquid membrane 100.

Membrane 220 or 320 held by membrane cell 212 or 312 may be comprised of a microporous layer in contact with a macroporous layer, where the microporous layer is between the macroporous layer and the dense layer. For example, at FIG. 1, pores 105 and 106 might be in the microporous layer while pores 103 and 104 might be in the macroporous layer. The microporous layer is comprised of a plurality of micropores having an average pore diameter of less than about 100 nanometers. In an embodiment of the method disclosed herein, where the membrane is comprised of a microporous layer in contact with a macroporous layer and separating the macroporous layer from the dense layer, the deposited casting solution is applied and allowed to flow into plurality of micropores, such that the resulting casting solution layer is in close proximity or contact with the dense layer, and such that the resulting membrane liquid layer is contained at least partially within the plurality of micropores. This arrangement increase the capillary force experienced by membrane liquid layer following precipitation and assists in the subsequent durability of the supported liquid membrane in an operating environment. Moreover this structure allows the formation of very thin membrane liquid layer.

Casting solution 216 may be applied to porous layer 202 to generate deposited casting solution 217 in any manner. In an embodiment, casting solution 216 is applied drop-wise to porous layer 202 as illustrated, and subsequent spreading distributes casting solution 217 over porous layer 202. In another embodiment, casting solution 217 is applied as a spray. Typically casting solution 216 is applied to an exposed surface layer of porous layer 202, as illustrated at FIG. 2. Additionally, it may be advantageous to apply the volume of the casting solution to the porous layer in a sequential manner, by applying a first volume of casting solution to generate a first deposited casting solution, followed by applying a second volume of casting solution to generate a second deposited casting solution. This manner of application may provide advantage in producing a membrane liquid layer which extends substantially under the entire area of the dense layer, so that gaseous passages connecting the dense layer and the porous layer are mitigated or eliminated. Generally and without being bound by theory, if such gaseous passages remain after generating the first deposited casting solution and allowing the first deposited casting solution to establish itself in close proximity with the dense layer, the pressure difference acting across the dense layer will typically be exerted more strongly through the remaining gaseous passages than through the resulting casting solution layer. As a result, the second deposited casting solution is more likely to be drawn into these remaining gaseous passages between the dense layer and the porous layer. This sequential application may be repeated as many times as necessary to establish a casting solution layer and subsequent membrane liquid layer extending substantially under the entire area of the dense layer.

In an embodiment, a heat treatment is applied following the application of the casting solution to the porous layer by heating the membrane and the deposited casting solution to a temperature of greater than about 100° C. This heat treatment may aid in the spreading of the deposited casting solution through the plurality of interconnected pores, as well as accelerating the evaporation of the volatile solvent and the precipitation of the membrane liquid from the deposited casting solution. In an embodiment, the heat treatment is comprised of heating the membrane and the deposited casting solution to a temperature of greater than about 125° C. for a period of greater than about 3 hours. In another embodiment, the membrane and the deposited casting solution are heated to a temperature of about 150° C. for a period of about 4 hours.

Additionally, the membrane to which the disclosed methodology is applied may have any general shape or characterization. For example, the membrane may be a flat membrane, a planar membrane, a tubular membrane, or other such terms used in the art. Within this disclosure, the membrane may have any geometry provided that the membrane is comprised of a dense layer, a dense material, a skin surface, and porous layer arranged as described herein. Further, the membrane may be comprised of any material or combination of materials, provided that the described relationships between the dense layer, the dense material, the skin surface, and the porous layer are achieved.

Figure 4:
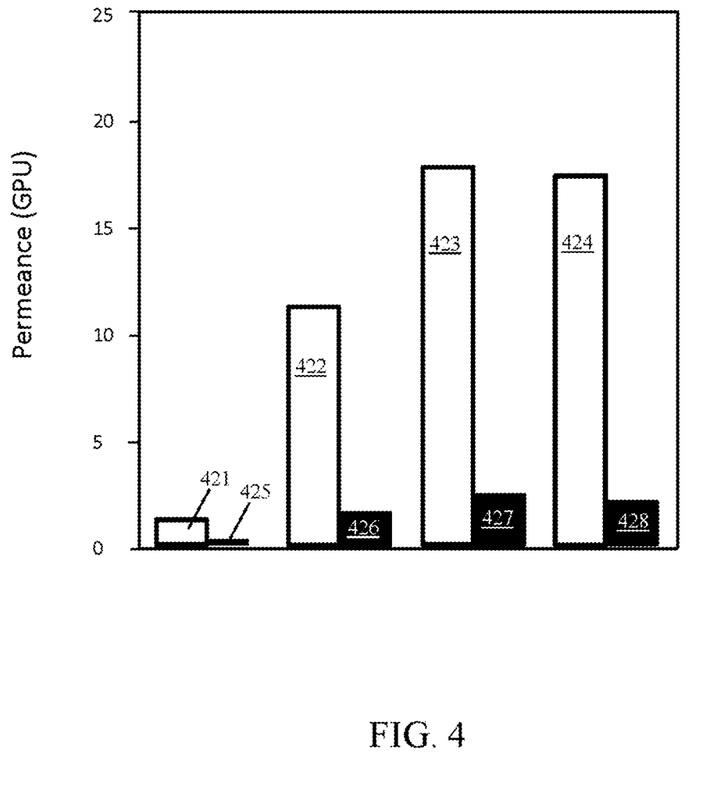
FIG. 4 illustrates the performance of supported liquid membranes produced under the methodology of the disclosure.
Figure 5:
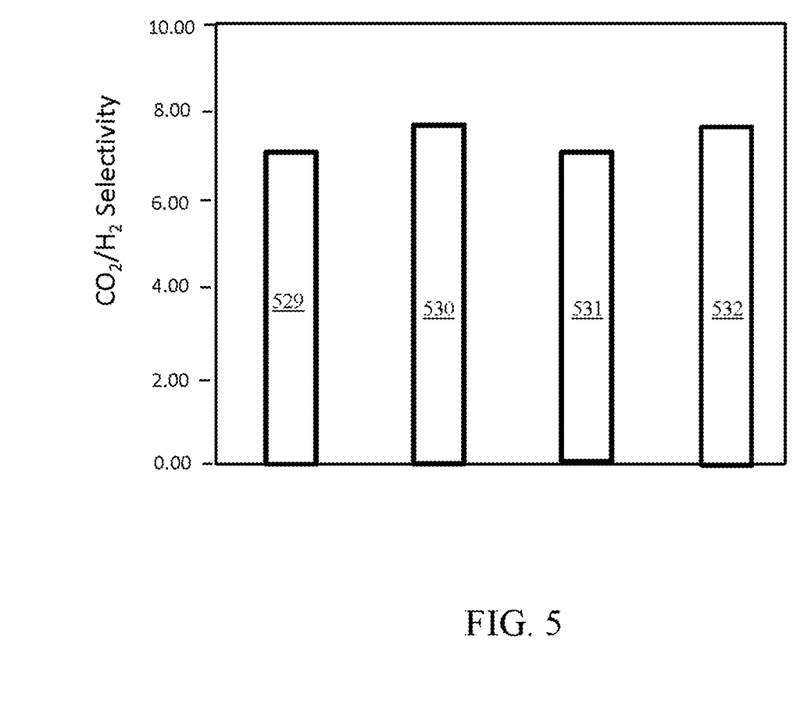
FIG. 5 further illustrates the performance of supported liquid membranes produced under the methodology of the disclosure.

The supported liquid membranes fabricated using the methodology of this disclosure and the thin membrane liquid layers which result provide significant advantage over supported liquid membranes generated under typical methodologies, such as soaking. As an example, FIG. 4 illustrates permeances achieved using supported liquid membranes fabricated under the disclosed methodology versus supported liquid membranes produced by soaking. In all cases, the membrane utilized for support of the ionic liquid was a composite membrane comprised of a porous layer of polyacrylonitrile and a dense layer of a fluoropolymer, where the porous layer was about 20 microns in thickness, and the dense layer less than 1 micron in thickness. The ionic liquid utilized was 1-n-hexyl-3-methylimidazolium bis(trifluoromethylsulfonyl)imide ([hmim] [$Tf_2N$]). FIG. 4 illustrates $CO_2$ and $H_2$ permeances determined for: (1) the membrane soaked in a pure ionic liquid ($CO_2$ permeance 421 and $H_2$ permeance 425); (2) the membrane soaked in a solution of 50 wt. % of the ionic liquid and ethanol ($CO_2$ permeance 422 and $H_2$ permeance 426); (3) the membrane loaded under the methodology of this disclosure with a casting solution of the ionic liquid and acetone ($CO_2$ permeance 423 and $H_2$ permeance 427); and (4) the membrane loaded under the methodology of this disclosure with a casting solution of the ionic liquid and a mixture of acetone and ethanol ($CO_2$ permeance 424 and $H_2$ permeance 428). The membranes were tested at 22° C. using a mixture of $CO_2$ and $H_2$ using a constant pressure permeation testing method. See e.g., Barillas et al., "The $CO_2$ permeability and mixed gas $CO_2/H_2$ selectivity of membranes composed of $CO_2$-philic polymers," *Journal of Membrane Science* 372 (2011). As illustrated at FIG. 4, soaked membrane (1) produced a $CO_2$ permeance 421 of 1.37 Gas Permeation Units (GPU) and an $H_2$ permeance 425 of 0.19 GPU, and soaked membrane (2) produced a $CO_2$ permeance 422 of 11.37 GPU and an $H_2$ permeance 426 of 1.47 GPU. In contrast, for the supported liquid membranes fabricated under the methodology of this disclosure, supported liquid membrane (3) produced a $CO_2$ permeance 423 of 17.92 Gas Permeation Units (GPU) and an $H_2$ permeance 427 of 2.54 GPU, and supported liquid membrane (4) produced a $CO_2$ permeance 424 of 17.68 GPU and an $H_2$ permeance 428 of 2.32 GPU. This demonstrates that the supported liquid membranes fabricated under the methodology of this disclosure offer significant improvement over supported liquid membranes generated by traditional methods, such as soaking. Additionally FIG. 5 illustrates the $CO_2/H_2$ Selectivity of membranes (1), (2), (3), and (4) as 529, 530, 531, and 532 and indicates values of 7.13, 7.70, 7.05, and 7.61 respectively, indicating no degradation of selectivity for the supported liquid membranes fabricated under the disclosed methodology.

Thus disclosed here is a method for the fabrication of a supported liquid membrane comprised of a dense layer, a porous supporting layer, and a liquid layer within the porous layer, generally in close proximity to the dense layer. The method provides an effective means for coupling a highly permeable dense layer with a highly selective membrane liquid, greatly mitigating the permeance-selectivity tradeoff encountered in typical membranes, and provides a means whereby the membrane liquid can be distributed within the pores of a supporting membrane in a relatively thin, continuous fluid layer, rather than a layer extending throughout the supporting membrane and dictated through secondary influencing properties such as local pore size and viscosity. The disclosed method additionally mitigates concerns associated with liquid loss driven by differential pressure versus present capillary forces, and is particularly applicable to higher viscosity liquids such as ionic liquids.

It is to be understood that the above-described arrangements are only illustrative of the application of the principles of the present invention and it is not intended to be exhaustive or limit the invention to the precise form disclosed. Numerous modifications and alternative arrangements may be devised by those skilled in the art in light of the above teachings without departing from the spirit and scope of the present invention. It is intended that the scope of the invention be defined by the claims appended hereto.

In addition, the previously described versions of the present invention have many advantages, including but not limited to those described above. However, the invention does not require that all advantages and aspects be incorporated into every embodiment of the present invention.

All publications and patent documents cited in this application are incorporated by reference in their entirety for all purposes to the same extent as if each individual publication or patent document were so individually denoted.

What is claimed is:

1. A method of fabricating a supported liquid membrane comprising:
   obtaining a membrane, where the membrane is comprised of,
      a dense layer having a skin surface and comprised of a dense material;
      a porous layer in contact with the dense layer, where the porous layer is comprised of a plurality of interconnected pores, and where the porous layer is separated from the skin surface by at least a portion of the dense material;
   mixing a casting solution, where the casting solution is comprised of a membrane liquid and a volatile solvent, where the membrane liquid is soluble in the volatile solvent, and where the volatile solvent has a vapor pressure less than 400 torr at 25° C., and where the membrane liquid and the volatile solvent are miscible, and where the casting solution has a viscosity less than 100 centipoise at 25° C.;
   establishing a gaseous atmosphere within the plurality of interconnected pores comprising the porous layer, where the gaseous atmosphere exerts a total pressure within the plurality of interconnected pores, and where a partial pressure of the volatile solvent in the gaseous atmosphere is less than the vapor pressure of the volatile solvent;
   generating a pressure difference across the dense layer and the porous layer such that a total pressure on the skin surface is from about 100 to about 600 torr less than the total pressure exerted by the gaseous atmosphere within the plurality of interconnected pores;

applying a volume of the casting solution to the porous layer after establishing the gaseous atmosphere and generating the pressure difference, thereby generating a deposited casting solution, and allowing at least a portion of the deposited casting solution to flow into the plurality of interconnected pores; and waiting a period of time such that at least some portion of the volatile solvent in the at least a portion of the deposited casting solution evaporates and some portion of the membrane liquid in the at least a portion of the deposited casting solution precipitates, thereby generating a membrane liquid layer in the membrane, and thereby generating the supported liquid membrane.

2. The method of claim 1 where the membrane liquid has a viscosity greater than about 25 centipoise at a temperature of 25° C.

3. The method of claim 2 where the casting solution has a viscosity less than 10 centipoise at 25° C. and where the total pressure on the skin surface is from about 200 to about 500 torr less than the total pressure exerted by the gaseous atmosphere within the plurality of interconnected pores.

4. The method of claim 1 where the membrane liquid is an ionic liquid.

5. The method of claim 4 where the viscosity of the ionic liquid is greater than about 75 centipoise at a temperature of 25° C.

6. The method of claim 1 further comprised of heating the deposited casting solution to a temperature greater than about 100° C.

7. The method of claim 1 where the porous layer is comprised of a microporous layer in contact with a macroporous layer, where the microporous layer is between the macroporous layer and the dense layer, and where the microporous layer is comprised of a plurality of micropores, where the plurality of micropores have an average pore diameter of less than about 100 nanometers, and where allowing the at least a portion of the deposited casting solution to flow into the plurality of interconnected pores is comprised of allowing the at least a portion of the deposited casting solution to flow into the plurality of micropores.

8. The method of claim 1 where applying the volume of the casting solution is comprised of applying a first volume of the casting solution, thereby generating a first deposited casting solution, and allowing at least a portion of the first deposited casting solution to flow into the plurality of interconnected pores, then applying a second volume of the casting solution, thereby generating a second deposited casting solution, and allowing at least a portion of the second deposited casting solution to flow into the plurality of interconnected pores.

9. The method of claim 1 where a thickness of the dense layer is less than about two microns.

10. The method of claim 1 where the membrane liquid is an ionic liquid and where a concentration of the ionic liquid in the casting solution is from about 5 milligrams of the ionic liquid per milliliter of the casting solution to about 500 milligrams of the ionic liquid per milliliter of the casting solution.

11. The method of claim 10 where the volatile solvent is acetone, ethanol, or a mixture of acetone and ethanol.

12. A method of fabricating a supported liquid membrane comprising:

obtaining a membrane, where the membrane is comprised of, a dense layer having a skin surface and comprised of a dense material;

a porous layer in contact with the dense layer, where the porous layer is comprised of a plurality of interconnected pores, and where the porous layer is separated from the skin surface by at least a portion of the dense material;

mixing a casting solution, where the casting solution is comprised of an ionic liquid and a volatile solvent, where the ionic liquid is soluble in the volatile solvent, and where the ionic liquid has a viscosity greater than about 25 centipoise at a temperature of 25° C., and where the volatile solvent has a vapor pressure less than 400 torr at 25° C., and where the ionic liquid and the volatile solvent are miscible, and where the casting solution has a viscosity less than 100 centipoise at 25° C.;

establishing a gaseous atmosphere within the plurality of interconnected pores comprising the porous layer, where the gaseous atmosphere exerts a total pressure within the plurality of interconnected pores, and where a partial pressure of the volatile solvent in the gaseous atmosphere is less than the vapor pressure of the volatile solvent;

generating a pressure difference across the dense layer and the porous layer such that a total pressure on the skin surface is from about 100 to about 600 torr less than the total pressure exerted by the gaseous atmosphere within the plurality of interconnected pores;

applying a volume of the casting solution to the porous layer after establishing the gaseous atmosphere and generating the pressure difference, thereby generating a deposited casting solution, and allowing at least a portion of the deposited casting solution to flow into the plurality of interconnected pores; and waiting a period of time such that at least some portion of the volatile solvent in the at least a portion of the deposited casting solution evaporates and some portion of the ionic liquid in the at least a portion of the deposited casting solution precipitates, thereby generating an ionic liquid layer in the membrane, and thereby generating the supported liquid membrane.

13. The method of claim 12 where the viscosity of the ionic liquid is greater than about 75 centipoise at a temperature of 25° C.

14. The method of claim 13 where a concentration of the ionic liquid in the casting solution is from about 5 milligrams of the ionic liquid per milliliter of the casting solution to about 500 milligrams of the ionic liquid per milliliter of the casting solution.

15. The method of claim 14 where the porous layer is comprised of a microporous layer in contact with a macroporous layer, where the microporous layer is between the macroporous layer and the dense layer, and where the microporous layer is comprised of a plurality of micropores, where the plurality of micropores have an average pore diameter of less than about 100 nanometers, and where allowing the at least a portion of the deposited casting solution to flow into the plurality of interconnected pores is comprised of allowing the at least a portion of the deposited casting solution to flow into the plurality of micropores.

16. The method of claim 15 where the casting solution has a viscosity less than 10 centipoise at 25° C. and where the total pressure on the skin surface is from about 200 to about 500 torr less than the total pressure exerted by the gaseous atmosphere within the plurality of interconnected pores.

17. The method of claim 15 further comprised of heating the deposited casting solution to a temperature greater than about 100° C.

18. The method of claim 15 where applying the volume of the casting solution is comprised of applying a first volume of the casting solution, thereby generating a first deposited casting solution, and allowing at least a portion of the first deposited casting solution to flow into the plurality of interconnected pores, then applying a second volume of the casting solution, thereby generating a second deposited casting solution, and allowing at least a portion of the second deposited casting solution to flow into the plurality of interconnected pores.

19. The method of claim 15 where a thickness of the dense layer is less than about two microns.

20. A method of fabricating a supported liquid membrane comprising:
  obtaining a membrane, where the membrane is comprised of,
    a dense layer having a skin surface and comprised of a dense material, where a thickness of the dense layer is less than about two microns;
    a porous layer in contact with the dense layer, where the porous layer is comprised of a plurality of interconnected pores, and where the porous layer is separated from the skin surface by at least a portion of the dense material, and where the porous layer is comprised of a microporous layer in contact with a macroporous layer, where the microporous layer is between the macroporous layer and the dense layer, and where the microporous layer is comprised of a plurality of micropores, where the plurality of micropores have an average pore diameter of less than about 100 nanometers;
  mixing a casting solution, where the casting solution is comprised of an ionic liquid and a volatile solvent, where the ionic liquid is soluble in the volatile solvent, and where the ionic liquid has a viscosity greater than about 75 centipoise at a temperature of 25° C., and where the volatile solvent has a vapor pressure less than 400 torr at 25° C., and where the ionic liquid and the volatile solvent are miscible, and where the casting solution has a viscosity less than 10 centipoise at 25° C., and where a concentration of the ionic liquid in the casting solution is from about 5 milligrams of the ionic liquid per milliliter of the casting solution to about 500 milligrams of the ionic liquid per milliliter of the casting solution;
  establishing a gaseous atmosphere within the plurality of interconnected pores comprising the porous layer, where the gaseous atmosphere exerts a total pressure within the plurality of interconnected pores, and where a partial pressure of the volatile solvent in the gaseous atmosphere is less than the vapor pressure of the volatile solvent;
  generating a pressure difference across the dense layer and the porous layer such that a total pressure on the skin surface is from about 200 to about 500 torr less than the total pressure exerted by the gaseous atmosphere within the plurality of interconnected pores;
  applying a volume of the casting solution to the porous layer after establishing the gaseous atmosphere and generating the pressure difference, thereby generating a deposited casting solution, and allowing at least a portion of the deposited casting solution to flow into the plurality of micropores; and
  waiting a period of time such that at least some portion of the volatile solvent in the at least a portion of the deposited casting solution evaporates and some portion of the ionic liquid in the at least a portion of the deposited casting solution precipitates, thereby generating an ionic liquid layer in the membrane, and thereby generating the supported liquid membrane.

* * * * *